(12) United States Patent
Lu et al.

(10) Patent No.: US 8,721,155 B2
(45) Date of Patent: May 13, 2014

(54) LIGHT BAR ASSEMBLY AND BACKLIGHT MODULE

(75) Inventors: Shuang Lu, Shenzhen (CN); Yan-Xue Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 289 days.

(21) Appl. No.: 13/380,859

(22) PCT Filed: Dec. 14, 2011

(86) PCT No.: PCT/CN2011/083932
§ 371 (c)(1),
(2), (4) Date: Dec. 26, 2011

(87) PCT Pub. No.: WO2013/082829
PCT Pub. Date: Jun. 13, 2013

(65) Prior Publication Data
US 2013/0141939 A1     Jun. 6, 2013

(51) Int. Cl.
*H01R 33/00*          (2006.01)
(52) U.S. Cl.
USPC .......................... 362/631; 362/612; 362/646
(58) Field of Classification Search
USPC ............... 362/217.08, 217.09, 221, 225, 612, 362/613, 631, 646
See application file for complete search history.

(56) References Cited

U.S. PATENT DOCUMENTS

| 8,154,702 | B2 * | 4/2012 | Kim | 362/631 |
| 2008/0112189 | A1 * | 5/2008 | Okuda | 362/612 |
| 2008/0192505 | A1 * | 8/2008 | Park | 362/631 |
| 2010/0149834 | A1 * | 6/2010 | Kim et al. | 362/613 |

FOREIGN PATENT DOCUMENTS

| CN | 101630091 A | 1/2010 |
| CN | 101649966 A | 2/2010 |
| CN | 201412740 Y | 2/2010 |
| CN | 201434948 Y | 3/2010 |
| CN | 101737676 A | 6/2010 |
| CN | 102088818 A | 6/2011 |
| JP | 2005-3882 A | 1/2005 |

* cited by examiner

*Primary Examiner* — Y My Quach Lee
(74) *Attorney, Agent, or Firm* — Cheng-Ju Chiang

(57) ABSTRACT

A light bar assembly and a backlight module are disclosed. The light bar assembly comprise a light source, a circuit board and a connector. The circuit board comprises a first supporting portion and a bending portion which is bent from the first supporting portion, and the light source is disposed on the first supporting portion. The connector is electrically connected to the light source, and the connector is disposed on the bending portion. Accordingly, by providing the bending portion on the circuit board and disposing the connector on the bending portion in the light bar assembly and the backlight module of the present disclosure, it is unnecessary to cut a portion of the light guide plate corresponding to the connector during the assembling process. Thereby, both the risk of light leakage from the backlight module and the product cost are reduced, and reliability of the backlight module is improved.

3 Claims, 5 Drawing Sheets

LIGHT BAR ASSEMBLY AND BACKLIGHT MODULE

FIELD OF THE INVENTION

The present disclosure generally relates to the technical field of liquid crystal display (LCD) backlights, and more particularly, to a light bar assembly and a backlight module.

BACKGROUND OF THE INVENTION

At present, light bar assemblies used in LCD backlight modules produced in large batches are all of straight-bar forms. As shown in FIG. 1, a conventional light bar assembly mainly comprises a light source 101, a circuit board 102 and a connector 103. The light source 101 and the connector 103 are located at a same side of the circuit board 102. The circuit board 102 is of a long strip form, and a plane in which an upper surface of the connector 103 is located is higher than a plane in which an upper surface of the light source 101 is located. Because the upper surface of the connector 103 protrudes relative to the upper surface of the light source 101, a portion of a light guide plate (LGP) 104 corresponding to the protruding portion of the connector 103 must be cut to avoid the connector 103 when the light bar assembly of this structure is used in a backlight module, as shown in FIG. 2. However, cutting the light guide plate 104 leads to a risk of light leakage from the backlight module and adds to the production cost of the light guide plate 104; and moreover, the connector 103 in such a backlight module has poor stability and tends to fall off due to vibrations.

Accordingly, a need exists in the art to provide a light bar assembly and a backlight module which can solve the aforesaid technical problems with conventional LCD backlight modules.

SUMMARY OF THE INVENTION

The primary objective of the present disclosure is to provide a light bar assembly and a backlight module, which can reduce the risks of falling-off of the connector from the light bar assembly and light leakage from the backlight module and save the production cost of the backlight module so as to improve reliability of the backlight module.

To achieve the aforesaid objective, the present disclosure provides a light bar assembly, which comprises a light source, a circuit board and a connector. The circuit board comprises a first supporting portion and a bending portion which is bent from the first supporting portion, and the light source is disposed on the first supporting portion. The connector is electrically connected to the light source, and the connector is disposed on the bending portion. The bending portion comprises a second supporting portion and a connecting portion, the connector is disposed on the second supporting portion, and the connecting portion connects and is disposed perpendicular to the first supporting portion and the second supporting portion.

Preferably, the second supporting portion is disposed in parallel to the first supporting portion.

Preferably, the light source is located at one side of the circuit board, the bending portion is bent towards the other side of the circuit board, and the connector is located at the one side of the circuit board.

Preferably, the light source is located at one side of the circuit board, the bending portion is bent towards the one side of the circuit board, and the connector is located at the other side of the circuit board.

To achieve the aforesaid objective, the present disclosure further provides a light bar assembly, which comprises a light source, a circuit board and a connector. The circuit board comprises a first supporting portion and a bending portion which is bent from the first supporting portion. The light source is disposed on the first supporting portion. The connector is electrically connected to the light source, and the connector is disposed on the bending portion.

Preferably, the bending portion comprises a second supporting portion and a connecting portion, the connector is disposed on the second supporting portion, and the connecting portion connects the first supporting portion and the second supporting portion.

Preferably, the second supporting portion is disposed in parallel to the first supporting portion, and the connecting portion is disposed perpendicular to the first supporting portion and the second supporting portion.

Preferably, the light source is located at one side of the circuit board, the bending portion is bent towards the other side of the circuit board, and the connector is located at the same side of the circuit board as the light source.

Preferably, the light source has a first surface which is in parallel to and away from the first supporting portion, the connector has a second surface which is in parallel to and away from the second supporting portion, and the second surface of the connector is no higher than the first surface of the light source.

Preferably, the second surface of the connector is located within a same plane as the first surface of the light source.

Preferably, the light source is located at one side of the circuit board, the bending portion is bent towards the one side of the circuit board, and the connector is located at the other side of the circuit board.

Preferably, the light source has a first surface which is in parallel to and away from the first supporting portion, the second supporting portion has a bottom surface which faces away from the connector, and the bottom surface of the second supporting portion is no higher than the first surface of the light source.

Preferably, the bottom surface of the second supporting portion is located within a same plane as the first surface of the light source.

To achieve the aforesaid objective, the present disclosure further provides a backlight module, which comprises a light guide plate and a light bar assembly. The light bar assembly comprises a light source, a circuit board and a connector. The light bar assembly is disposed adjacent to a side surface of the light guide plate. The circuit board comprises a first supporting portion and a bending portion which is bent from the first supporting portion, and the light source is disposed on the first supporting portion. The connector is electrically connected to the light source, and the connector is disposed on the bending portion.

Preferably, the bending portion comprises a second supporting portion and a connecting portion, the connector is disposed on the second supporting portion, and the connecting portion connects the first supporting portion and the second supporting portion.

Preferably, the second supporting portion is disposed in parallel to the first supporting portion, and the connecting portion is disposed perpendicular to the first supporting portion and the second supporting portion.

Preferably, the light source is located at one side of the circuit board, the bending portion is bent towards the other side of the circuit board, and the connector is located at the same side of the circuit board as the light source, the bending portion is located at an end portion of the circuit board, the light source has a first surface which is in parallel to and away from the first supporting portion, the connector has a second surface which is in parallel to and away from the second supporting portion, and the second surface of the connector is no higher than the first surface of the light source.

Preferably, the second surface of the connector is located within a same plane as the first surface of the light source.

Preferably, the light source is located at one side of the circuit board, the bending portion is bent towards the one side of the circuit board, the connector is located at the other side of the circuit board, the bending portion is located at an end portion of the circuit board, the light source has a first surface which is in parallel to and away from the first supporting portion, the second supporting portion has a bottom surface which faces away from the connector, and the bottom surface of the second supporting portion is no higher than the first surface of the light source.

Preferably, the bottom surface of the second supporting portion is located within a same plane as the first surface of the light source.

The present disclosure has the following benefits as compared to the prior art: by providing the bending portion on the circuit board and disposing the connector on the bending portion in the light bar assembly and the backlight module of the present disclosure, it is unnecessary to cut a portion of the light guide plate corresponding to the connector during the assembling process. Thereby, both the risk of light leakage from the backlight module and the product cost are reduced, and reliability of the backlight module is improved.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
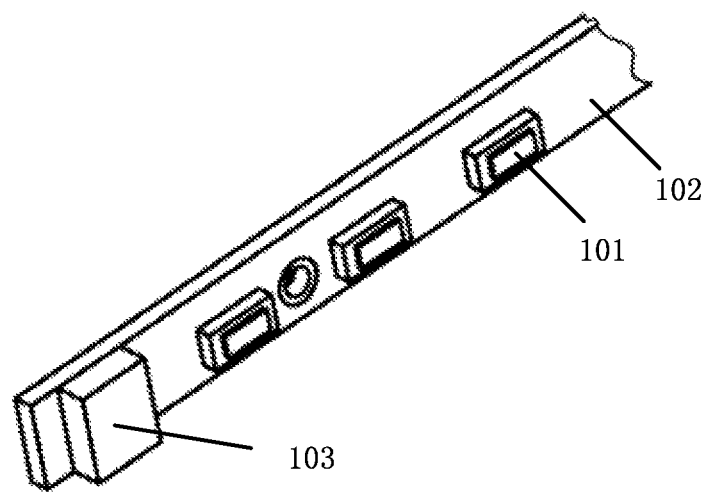
FIG. 1 is a schematic structural view of a conventional light bar assembly.
Figure 2:
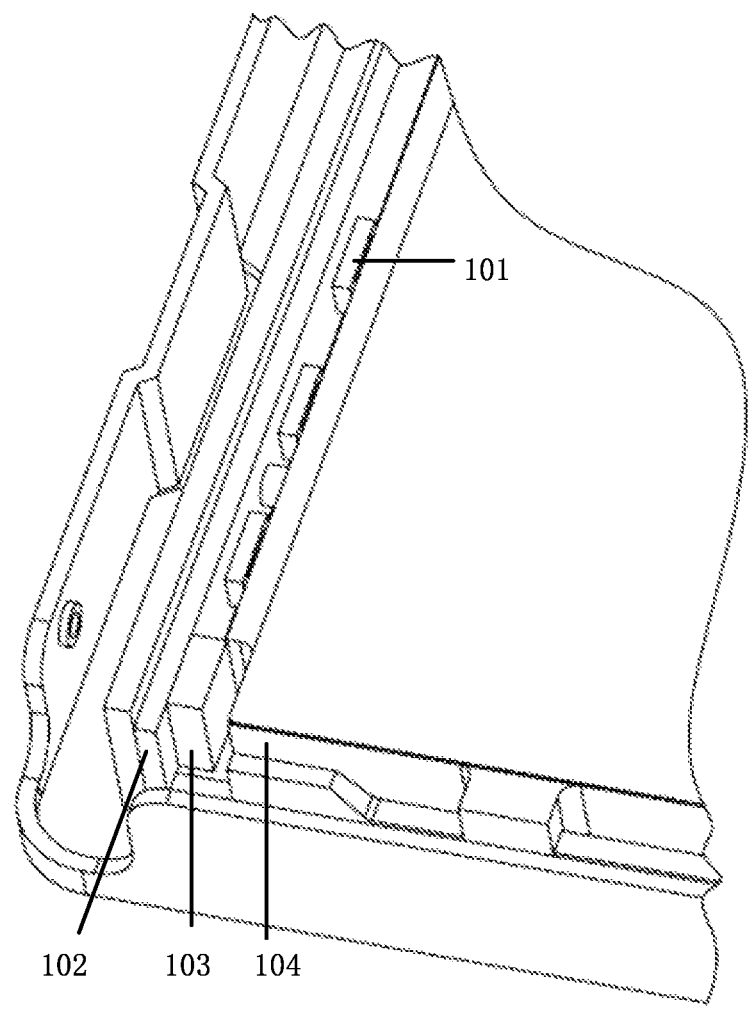
FIG. 2 is a schematic structural view of a backlight module comprising the conventional light bar assembly shown in FIG. 1.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Hereinbelow, the technical solutions of embodiments of the present disclosure will be described clearly and completely with reference to the attached drawings. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Figure 3:
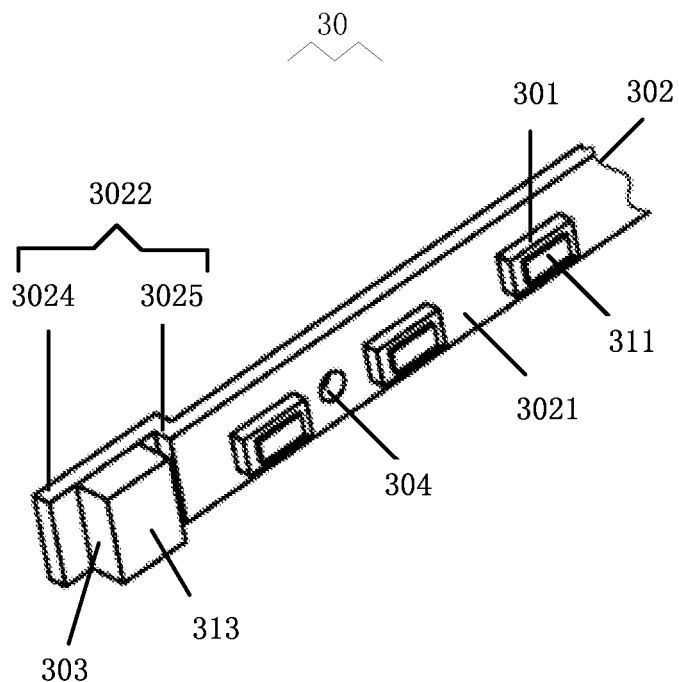
FIG. 3 is a schematic structural view of a first embodiment of a light bar assembly according to the present disclosure.

Referring to FIG. 3, there is shown a schematic structural view of a first embodiment of a light bar assembly according to the present disclosure.

As shown in FIG. 3, the light bar assembly 30 of this embodiment mainly comprises a light source 301, a circuit board 302 and a connector 303.

The light source 301 is a light emitting diode (LED) lamp located at one side of the circuit board 302. The number of the LED lamps is not limited in the present disclosure and may be determined depending on specific requirements. The circuit board 302 comprises a first supporting portion 3021 and a bending portion 3022 which is bent towards the other side of the circuit board 302 from the first supporting portion 3021. The bending portion 3022 is located at an end portion of the circuit board 302, and comprises a second supporting portion 3024 and a connecting portion 3025. The connecting portion 3025 is used to connect the first supporting portion 3021 and the second supporting portion 3024, the second supporting portion 3024 is disposed in parallel to the first supporting portion 3021, and the connecting portion 3025 is disposed perpendicular to the first supporting portion 3021 and the second supporting portion 3024 respectively. The light source 301 is located on the first supporting portion 3021, and the connector 303 is located on the second supporting portion 3024. Moreover, the light source 301 is located at a same side of the circuit board 302 as the connector 303 and is electrically connected to the connector 303.

Figure 4:
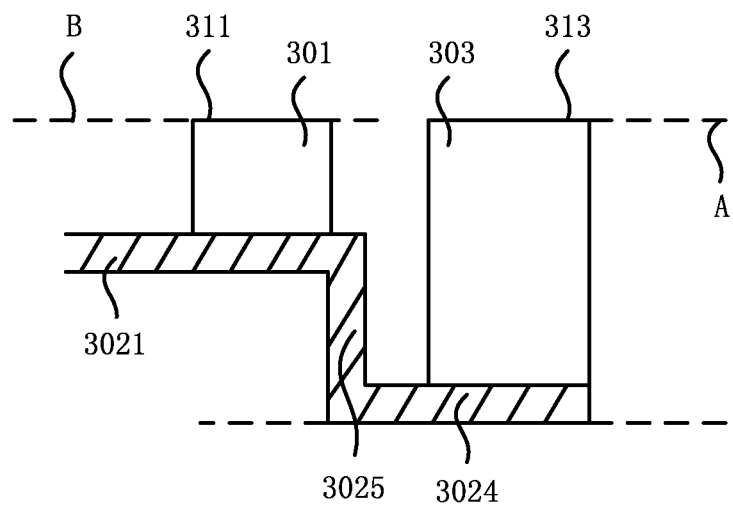
FIG. 4 is a schematic view illustrating relative positional relationships between a light source and a connector in the light bar assembly shown in FIG. 3.

The light source 301 has a first surface 311 which is in parallel to and away from the first supporting portion 3021, and the connector 303 has a second surface 313 which is in parallel to and away from the second supporting portion 3024. As shown in FIG. 4, the light source 301 and the connector 303 have the following relationship:

a plane (A) in which the second surface 313 of the connector 303 is located is no higher than a plane (B) in which the first surface 311 of the light source 301 is located.

In this embodiment, the first surface 311 is preferably located within a same plane as the second surface 313. Furthermore, the first supporting portion 3021 in this embodiment is further provided with a through-hole 304, of which the function will be further detailed in embodiments of the backlight module of the present disclosure.

Figure 5:
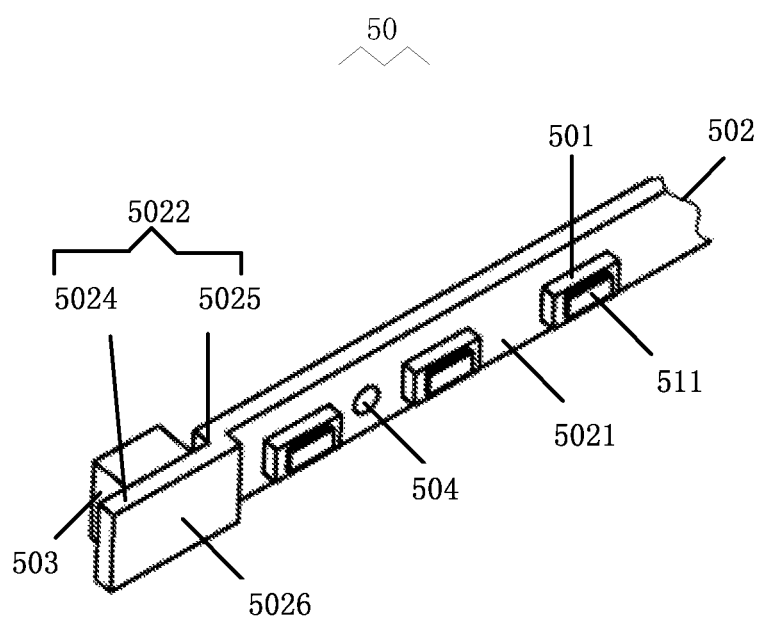
FIG. 5 is a schematic structural view of a second embodiment of a light bar assembly according to the present disclosure.

Referring to FIG. 5, there is shown a schematic structural view of a second embodiment of a light bar assembly according to the present disclosure. As shown in FIG. 5, the light bar assembly 50 of this embodiment differs from the light bar assembly 30 of the first embodiment in that, a bending portion 5022 comprising a second supporting portion 5024 and a connecting portion 5025 is bent towards a side of a circuit board 502 that is provided with a light source 501 thereon, and a connector 503 is located on the second supporting portion 5024 of the bending portion 5022 so that the connector 503 and the light source 501 are located on two opposite sides of the circuit board 502.

Figure 6:
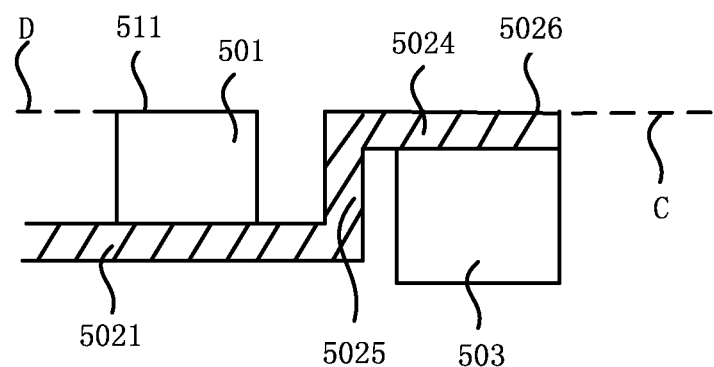
FIG. 6 is a schematic view illustrating relative positional relationships between a light source and a second supporting portion in the light bar assembly shown in FIG. 5.

The light source 501 has a first surface 511 which is in parallel to and away from a first supporting portion 5021, and the second supporting portion 5024 has a bottom surface 5026 which faces away from the connector 503. As shown in FIG. 6, the light source 501 and the second supporting portion 5024 has the following relationship:

a plane (C) in which the bottom surface 5026 of the second supporting portion 5024 is located is no higher than a plane (D) in which the first surface 511 of the light source 501 is located.

In this embodiment, the first surface 511 of the light source 501 is preferably located within a same plane as the bottom surface 5026 of the second supporting portion 5024.

Figure 7:
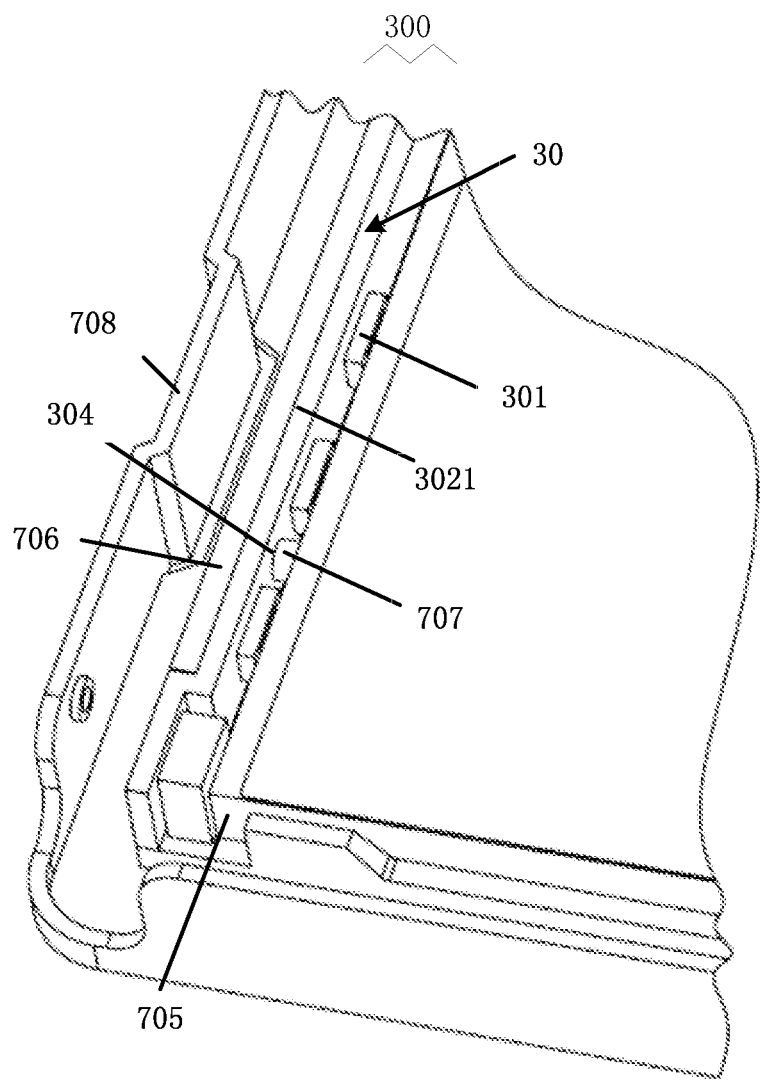
FIG. 7 is a schematic structural view of a first embodiment of a backlight module comprising the light bar assembly shown in FIG. 3 according to the present disclosure.

Referring to FIG. 7, there is shown a schematic structural view of a first embodiment of a backlight module comprising the light bar assembly shown in FIG. 3 according to the present disclosure.

As shown in FIG. 7, the backlight module 300 of this embodiment mainly comprises a light guide plate 705 and the light bar assembly 30 shown in FIG. 3, and the light source 301 is disposed opposite to the light guide plate 705. The structure of the light bar assembly 30 has been detailed above, so it will not be further described in this embodiment.

The backlight module 300 further comprises a fixing component 706, which comprises a fixing post 707, and the first supporting portion 3021 is disposed over the fixing post 707 through the through-hole 304. The fixing post 707 is inserted through the through-hole 304 (referring to FIG. 3) of the first supporting portion 3021 to abut against the light guide plate 705 so that the light bar assembly 30 and the light guide plate 705 can be fixed together. As a result, light emitted from the light source 301 can be transmitted stably by the light guide plate 705 to facilitate the subsequent illuminating and displaying operations.

Referring to FIG. 4, as the plane (A) in which the second surface 313 of the connector 303 is located is no higher than the plane (B) in which the first surface 311 of the light source 301 is located, the second surface 313 of the connector 303 no longer protrudes between the first surface 311 of the light source 301 and the light guide plate 705 in the backlight module 300 of the present disclosure, which can avoid an increase in the production cost caused by cutting the light guide plate 705 and reduce the risk of light leakage from the backlight module 300.

As shown in FIG. 7, the backlight module 300 further comprises a plastic frame 708 for receiving the light bar assembly 30 and the light guide plate 705 which are connected together by the fixing component 706. In this embodiment, the plastic frame 708 is used to protect various components disposed therein.

Figure 8:
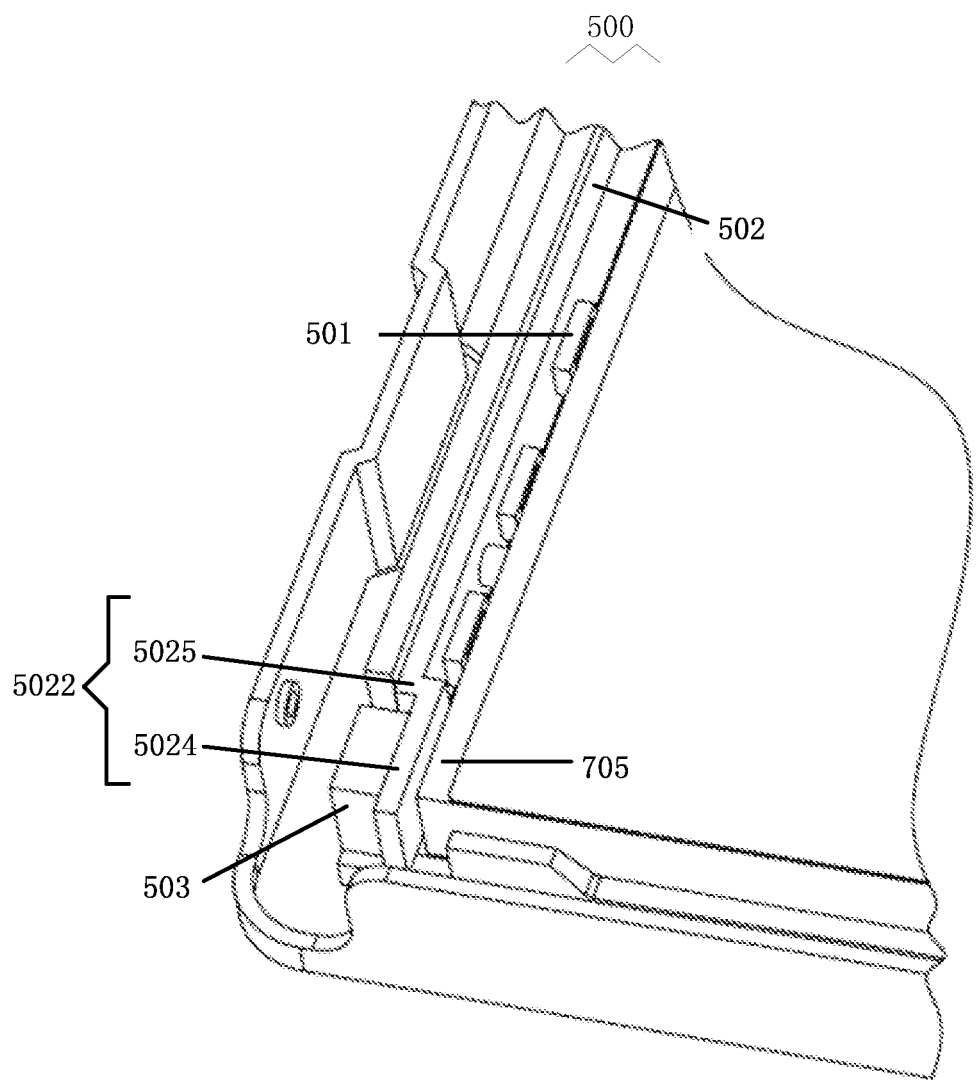
FIG. 8 is a schematic structural view of a second embodiment of the backlight module comprising the light bar assembly shown in FIG. 5 according to the present disclosure.

Referring to FIG. 8, there is shown a schematic structural view of a second embodiment of the backlight module comprising the light bar assembly shown in FIG. 5 according to the present disclosure.

As shown in FIG. 8, the backlight module 500 of this embodiment differs from the backlight module 300 of the first embodiment mainly in that, the bending portion 5022 is bent towards a side of the circuit board 502 that is provided with the light source 501, and the connector 503 is located on the second supporting portion 5024 of the bending portion 5022 so that the connector 503 and the light source 501 are located on two opposite sides of the circuit board 502.

Referring to FIG. 6 together, as the plane (C) in which the bottom surface 5026 of the second supporting portion 5024 is located is no higher than the plane (D) in which the first surface 511 of the light source 501 is located, it is unnecessary to cut a portion of the light guide plate 705 corresponding to the connector 503 in order to avoid the connector 503 when the backlight module 500 is assembled. Thereby, both the production cost and the risk of light leakage from the backlight module 500 are reduced.

Accordingly, by providing the bending portion on the circuit board and disposing the connector on the bending portion in the light bar assembly and the backlight module of the present disclosure, it is unnecessary to cut a portion of the light guide plate corresponding to the connector during the assembling process. Thereby, both the risk of light leakage from the backlight module and the product cost are reduced, and reliability of the backlight module is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A light bar assembly, comprising:
   a light source;
   a circuit board, comprising a first supporting portion and a bending portion which is bent from the first supporting portion, wherein the light source is disposed on the first supporting portion; and
   a connector electrically connected to the light source, wherein the connector is disposed on the bending portion;
   wherein the bending portion comprises a second supporting portion and a connecting portion, the connector is disposed on the second supporting portion, and the connecting portion connects the first supporting portion and the second supporting portion;
   wherein the second supporting portion is disposed in parallel to the first supporting portion, and the connecting portion is disposed perpendicular to the first supporting portion and the second supporting portion;
   wherein the light source is located at one side of the circuit board, the bending portion is bent towards the other side of the circuit board, and the connector is located at the one side of the circuit board;
   wherein the light source has a first surface which is in parallel to and away from the first supporting portion, the connector has a second surface which is in parallel to and away from the second supporting portion, and the second surface is no higher than the first surface;
   wherein the second surface is located within a same plane as the first surface.

2. A light bar assembly, comprising:
   a light source;
   a circuit board, comprising a first supporting portion and a bending portion which is bent from the first supporting portion, wherein the light source is disposed on the first supporting portion; and
   a connector electrically connected to the light source, wherein the connector is disposed on the bending portion;
   wherein the bending portion comprises a second supporting portion and a connecting portion, the connector is disposed on the second supporting portion, and the connecting portion connects the first supporting portion and the second supporting portion;

wherein the second supporting portion is disposed in parallel to the first supporting portion, and the connecting portion is disposed perpendicular to the first supporting portion and the second supporting portion;

wherein the light source is located at one side of the circuit board, the bending portion is bent towards the one side of the circuit board, and the connector is located at the other side of the circuit board;

wherein the light source has a first surface which is in parallel to and away from the first supporting portion, the second supporting portion has a bottom surface which faces away from the connector, and the bottom surface is no higher than the first surface;

wherein the first surface is located within a same plane as the bottom surface.

3. A backlight module, comprising:
a light guide plate; and
a light bar assembly disposed adjacent to a side surface of the light guide plate, the light bar assembly comprising:
a light source;
a circuit board, comprising a first supporting portion and a bending portion which is bent from the first supporting portion, wherein the light source is disposed on the first supporting portion; and
a connector electrically connected to the light source, wherein the connector is disposed on the bending portion;

wherein the bending portion comprises a second supporting portion and a connecting portion, the connector is disposed on the second supporting portion, and the connecting portion connects the first supporting portion and the second supporting portion;

wherein the second supporting portion is disposed in parallel to the first supporting portion, and the connecting portion is disposed perpendicular to the first supporting portion and the second supporting portion;

wherein the light source is located at one side of the circuit board, the bending portion is bent towards the other side of the circuit board, the connector is located at the one side of the circuit board, the bending portion is located at an end portion of the circuit board, the light source has a first surface which is in parallel to and away from the first supporting portion, the connector has a second surface which is in parallel to and away from the second supporting portion, and the second surface is no higher than the first surface;

wherein the second surface is located within a same plane as the first surface.

* * * * *